(12) United States Patent
Hilliard et al.

(10) Patent No.: US 6,654,493 B1
(45) Date of Patent: Nov. 25, 2003

(54) CHARACTERING AND CALIBRATING AN IMAGE CAPTURE DEVICE

(75) Inventors: William J. Hilliard, San Francisco, CA (US); Peter G. Engeldrum, Winchester, MA (US); Thomas L. Strother, San Francisco, CA (US)

(73) Assignee: Lightsurf Technologies, Inc., Santa Cruz, CA (US)

( * ) Notice: Subject to any disclaimer, the term of this patent is extended or adjusted under 35 U.S.C. 154(b) by 0 days.

(21) Appl. No.: 09/440,013

(22) Filed: Nov. 12, 1999

Related U.S. Application Data

(60) Provisional application No. 60/108,228, filed on Nov. 13, 1998.

(51) Int. Cl.[7] ................................................. G06K 9/00
(52) U.S. Cl. ...................... 382/167; 358/504; 358/509; 358/520
(58) Field of Search ................................. 382/162, 167; 358/518–540; 345/597–628

(56) References Cited

U.S. PATENT DOCUMENTS

| | | | | |
|---|---|---|---|---|
| 5,751,450 A | * | 5/1998 | Robinson | 358/518 |
| 5,767,983 A | * | 6/1998 | Terashita | 358/518 |
| 5,805,213 A | * | 9/1998 | Spaulding et al. | 348/222 |
| 5,821,993 A | * | 10/1998 | Robinson | 348/187 |
| 5,918,192 A | * | 6/1999 | Tomaszewski | 358/504 |
| 6,016,161 A | * | 1/2000 | Robinson | 348/187 |
| 6,037,950 A | * | 3/2000 | Meir et al. | 345/431 |
| 6,081,254 A | * | 6/2000 | Tanaka et al. | 358/518 |
| 6,088,038 A | * | 7/2000 | Edge et al. | 345/431 |
| 6,108,008 A | * | 8/2000 | Ohta | 345/431 |

* cited by examiner

Primary Examiner—Jingge Wu

(57) ABSTRACT

A method and system for calibrating and characterizing an image capture device is disclosed. Using a calibrated display of known colorimetric properties, a feedback loop method and system is disclosed such that the image capture device capture device can be calibrated.

42 Claims, 2 Drawing Sheets

CHARACTERING AND CALIBRATING AN IMAGE CAPTURE DEVICE

RELATED APPLICATION

This application claims priority of provisional application Serial No. 60/108,228 filed Nov. 13, 1998.

BACKGROUND OF THE INVENTION

1. Field of the Invention

This invention relates generally to a method and system for calibrating and characterizing image capture devices using a calibrated display of known colorimetric properties. More particularly, this invention relates to image capture devices using digital imaging technology.

2. Description of the Prior Art

Conventional methods for digital or electronic color image capture devices require the characterization and calibration of each device in order to produce digital values that have a known relationship to the original scene or image. This calibration or characterization data can be stored in a data file called a "profile" describing the unique color capture characteristics of that specific device. Unit to unit variances in image capture devices, especially in the charge-coupled devices (CCD's) in consumer digital cameras, means that a single "generic" profile for one class or model of that device may not be accurate enough for good color imaging results. A unique profile for each unique image capture device is best for assuring that the device provides adequate color accuracy.

With respect to image capture devices, (such as a digital camera, for example), calibrating an image capturing device can be difficult due to aging of a system or the effect of a dusty environment. An imaging system typically suffers problems such as image defects or distortion. Further, it can be difficult to find a method that is simple enough for most end-users to implement. In addition, further problems can exist such as photo-response non-uniformity (PRNO) of the CCD to a light source, or distortion of the mirror or lens.

Aside from variances in CCD's and other sensors, one of the reasons for the unit-to-unit variability among image capture devices is that the spectral sensitivities or responsivities of the image capture device may not be colorimetric. The spectral responses often are not a linear transformation of the CIE standard observer color matching functions. This property can inherently produce errors in the values that describe the captured color image. These errors are often known to those skilled in the art as instrument metamerism. In simple terms this means that two colors typically seen as different by a human observer are captured or recorded as the same set of values by the image capture device. Conversely, two colors that are typically seen as a match, identical, are captured and recorded by the device as two different sets of values. Also, due to manufacturing variations, the spectral responsivity or sensitivity of the various "color" channels of the image capture device may vary from device to device. Additionally, design criteria and production variations result in different relationships between the amount of "scene" or original spectral radiance and recorded or captured color value. This is commonly known to those skilled in the art of imaging science as the Tone Reproduction, and is also known as the input/output transfer function or "electrooptic" transfer function. All of these factors, and many more, require that the image capture device be characterized and calibrated so the captured digital values are a useful representation of the color in the original object or scene.

This problem is widely recognized and several national and international standards organizations have defined a standard set of test patterns for use in the calibration and characterization of imaging devices. One of the most popular of these test patterns or targets are the IT8 (ANSI-IT8.7/1-3) series and the SCID (ISO12640:1995) and the MacBeth Color Checker. These patterns generally consist of an array of color patches or areas that have known CIE XYZ tristimulus values or CIE L*a*b* values or even perhaps spectral reflectance factor properties.

Although the present art is generally adequate for the process of calibration and characterization of image capture devices, the test patterns are often expensive to produce and of fixed colors. In some cases the test patterns are so large (SCID) that usage can be extremely difficult on desktop printers. Another disadvantage is that the colors are standardized and therefore fixed, and such fixed set of colors or color patches may not be optimum for the calibration and/or characterization of any particular image capture device.

Thus, there is a present need for a more accessible, affordable and simple method and system that can be used by consumers to calibrate and characterize image capture devices. Further, it would be advantageous for the method and system to calibrate and characterize image capture devices with relatively good quality color representation and with minimum overhead cost. Still further, the method and system would be relatively easy to use and would provide a flexible calibrated colorimetric color system which is well suited to various image capture devices and can be supported with minimum cost to software and hardware vendors.

SUMMARY OF THE INVENTION

The present invention provides, in a first aspect, a method for calibrating image capture devices from a calibrated display of known calorimetric properties. It is therefore a primary object of this invention to provide a method and system for compensating the aforementioned problems. The present invention provides a method for calibrating or characterizing an image capture device providing feedback from a known flexible calibrated display device. This feedback can either be remote or a local.

The present invention provides, in a first aspect, a method for calibrating and characterizing an image capture device, including the steps of first, calibrating a display device to generate a calorimetrically calibrated display. Next, displaying at least one reference image on the calibrated display to generate a calibrated reference image with known colorimetric properties. Then, capturing at least one image from an image capture device to be calibrated, to generate a captured image. Next, comparing the captured image with the calibrated reference image. Thereafter, computing a relationship between the captured image and the calibrated reference image to generate information on differences, and finally, writing a profile describing the relationship such that the profile describes the colorimetric characteristics of the image capture device.

In another aspect, the present invention provides a system for calibrating and characterizing an image capture device. The system includes, display means for displaying calibrated reference images, image capture means for capturing at least one image from an image capture device; processing means to compute a calorimetric profile based on a relationship between captured images and calibrated images, such that the profile describes the colorimetry of the image capture device.

These and other features and advantages of this invention will become further apparent from the detailed description and accompanying figures that follow. In the figures and description, numerals indicate the various features of the invention, like numerals referring to like features throughout both the drawing figures and the written description.

DETAILED DESCRIPTION OF THE PREFERRED EMBODIMENT(S)

The present invention provides a method and a system for determining the color biases of an image capture device, such as a digital camera, or a color scanner, using a color display of known color or spectral characteristics that can be used by an ordinary image capture device user.

In particular, the present invention eliminates costly and fixed set of test colors by using a flexible color characterized/calibrated or spectral radiance calibrated display device for a color test pattern generation. One particular aspect of the present invention is that the color characteristics of the image capture device can be stored in a suitable format for use in a color management system or other device or system that can use or requires calibrated color image data, or in a characterized and calibrated device, which can be a valuable feature.

This invention describes a method and a system for the color calibration of image capture devices, such as digital cameras, or color scanners, using a color display of known color or spectral characteristics. These color image capture devices may have as few as one channel, usually called black and white or monochrome system, or more than the usual three, "red", "green", and "blue" channels or signal paths. However, any number or choice of colors could be used in this invention.

Figure 1:
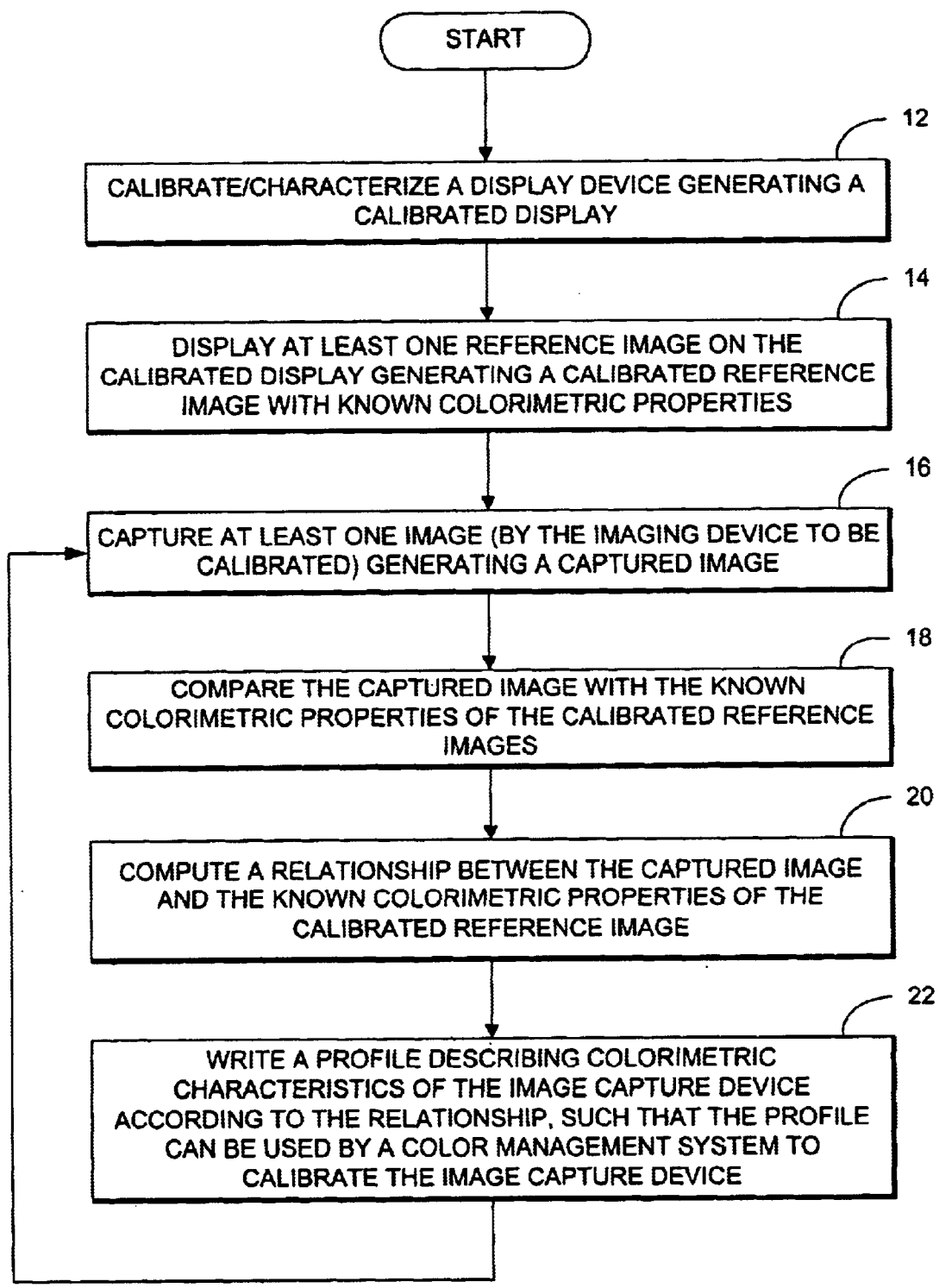
FIG. 1 is a flow chart illustrating a method for calibrating and characterizing an image capture device via a feedback loop from a known calibrated display in accordance with the preferred embodiment of the present invention.

Referring to FIG. 1, a flow chart 10 of a method for calibrating and characterizing an image capture device via a feedback loop from a known calibrated display is illustrated. The present invention is implemented when a user calibrates/characterizes a display device to generate a calibrated display (step 12) of known calorimetric characteristics. The present invention then displays at least one reference image on the calibrated display generating a calibrated reference image (step 14). The present invention then captures images from the imaging captured device to be calibrated (step 16). The present invention then compares the captured images to each of the calibrated reference images (step 18) and a relationship is computed between the captured images and the calibrated reference images (step 20). The present invention then writes a profile describing the colorimetric characteristics of the device such that the profile can be used by a color management system to calibrate the image capture device (step 22) via a feedback or to correct images captured by the device.

As noted above, in step 12, the present invention calibrates or characterizes a display device to form a calibrated display such that the spectral radiometric or colorimetric properties are known. According to the present invention, the display is typically a variable display device. The display device can be any display device that can display an image. Further, this method is not limited to a display using only three colors, such as "red", "green" or "blue" (RGB) that is typical of most displays. For example, this method can be used with displays containing four or more primary colors, and for monochrome devices. According to another embodiment of the present invention, the display may also use a cathode ray tube, or a liquid crystal display, an emissive panel or any variety of other display devices. According to the preferred embodiment of this invention, a key feature of this display device is that it is not a static reflective sample with color regions of known colorimetric properties, but rather a changeable imaging device of known calorimetric characteristics.

In one embodiment of the present invention, a method of calibration and characterization can be the measurement of the chromaticities of the display primaries and the input/output, or TRC. These are used in conjunction with a model of the display system to calculate the spectral or colorimetric characteristics. Another method according to the present invention, is to display a number of colors with known RGB or other input values and build a multidimensional table relating the digital values driving the display to the display color characteristics.

One skilled in the art will recognize that the display device can be coupled to a Central Processing Unit (CPU) such that any hardware and/or software process can be used to perform the necessary calibration needed to calibrate the display device. In accordance with the present invention, a user may use any type of conventional or newly developed color calibration system including, for example, the interactive color calibration method disclosed in U.S. Pat. No. 5,638,117, or the self-calibrating display method disclosed in U.S. Pat. No. 5,512,961. In the most preferred embodiment of the present invention, the display device is a computer CRT and is calibrated using the aforementioned calibration methods.

Referring to step 14, the present invention displays at least one reference image on the calibrated display generating a calibrated reference image. Generally, to calibrate the image capture device, a user displays a reference image or series of images on the calibrated display device to create one or more calibrated reference images. These calibrated reference images can be written as a calibrated reference image profile which can be stored in memory and retrieved whenever this particular path is desired by the user, bypassing problems and cost associated with printing a fixed reference color test pattern, the latter which can be subjected to changes and deterioration over a period of time (for example, colors fading due to light exposure, etc.)

Preferably, the reference image or images that are displayed on the calibrated display are RGB and are redundant colors. In a preferred embodiment according to the present invention, a sequence of reference images are displayed, consisting of possible redundant colored areas. The reference images typically are sequentially of red, green, blue, white, and possibly other colors, each completely filling the display area on the display device. According to the present invention, the calibrated reference image is a display of known colorimetric properties and can also be referred to as a color test pattern.

However, image capture devices like cameras, for example, can often contain within them automatic adjustment algorithms or processes which can adjust their image capture for the spectral quality and quantity of the illumination or irradiance on the scene or object. Those skilled in the art will recognize that there are processes to compensate for the correlated color temperature of the illumination, so the output or recorded three digital values representing the "white point" stand in a correct ratio. This white point adjustment process is analogous to the process of chromatic adaptation that is performed by the human visual system as it attempts to keep the appearance of "white objects" white. Also of importance are processes that dynamically or statically adapt, via a setting on the device, to the dynamic or tonal range of the scene or object to be imaged. These processes can include adjusting the input/output or TRC of the image capture device. According to the present invention, to account for these processes the displayed colors can vary in their absolute luminance or level of spectral radiance to simulate the varying levels of illumination under which the image capture device will be used. The user must either compensate in the display device for the compensation algorithms in the image capture device, or the user must turn off the image compensation mechanisms in the image capture device, for example.

Another consideration in step 14 is the selection of colors or spectral radiances in the reference images, which must be displayed so as to correctly simulate the light source illuminating the scene or object or areas being image captured. As a preferred embodiment for the array of color patterns or test targets, the user would integrate, or average, to the chromaticity, tristimulus value, or correlated color temperature of the simulated light source. According to those skilled in the art, this is similar to the so-called "gray world" assumption that is used as the basis of color balancing color photographic prints and "white point" balancing video cameras. According to the present invention, other criteria for establishing the overall properties of a set of test patterns (of the reference images) to be displayed on the calibrated display device are possible and these would be guided by the overall objectives, goal, or usage of the color capture device.

A preferred embodiment according to the present invention, in the consideration in the selection of reference images (color test patterns) is to select the number and locations of colors, in color space, so there are a sufficient number in regions of the capture device color space where there is large curvature of a high degree of nonlinearity. Often the calibration or characterization data from the image capture device is used to build a multidimensional table for determining color values of the device. For example, if the color capture device has a high degree of nonlinearity more data or table points are needed for accurate conversion and therefore the spacing of the test target colors can be very critical.

Yet another area is the spatial arrangement of color on the display. Both displays and image capture devices have variation in their output and sensitivity, respectively. To minimize this variation both the spatial location of the test pattern on the display and the spatial location of the test pattern imaged on the image capture device should be varied. Appropriate averaging of the recorded and stored data can be used to reduce these spatial nonuniform effects.

According to the present invention, other considerations in displaying reference images, are ease of use, such as displaying test areas that are large enough to be easily captured by an imaging capture device, without requiring the user to precisely adjust the image area captured to the image area displayed on the display device. For example, when an end user to capture a snapshot of a full screen of red, green, and blue sequentially since there is often no requirement for precise alignment if full screens of color are displayed.

The next portion of step 14 is to generate a calibrated reference image, or series of images, of the reference image (color test pattern), displayed on the calibrated display. The reference image may be a single image, or a plurality of images shown sequentially in fixed or random order, which are captured by the image capture device in one or more capture steps.

According to the present invention, the calibrated display may be a distinct device from the image capture device, or for example, as in the case with many digital cameras, it may be a display built into the image capture device itself. In the latter case, the calibrated display would be folded over, or moved, or adjusted so that the camera can capture an image of its own display. In other words, the user would just snap pictures of each of the reference images in random or specific sequence. This step may also involve the use of a color or other optical filter placed over the face of the calibrated display or over the "lens" of the image capture device.

Referring to step 16, the present invention then captures images from the imaging captured device to be calibrated or, in other words, captures the calibrated reference image displayed as described in above instep 14 on the image capture devices' light sensitive elements. For an image capture device such as a camera, the device can be positioned or pointed at the display and an image of the color test patterns, within the test target, or including the test target and a known or unknown surround, and such reference patterns are imaged on the image capture surface of the device. Another possible method for a flat bed scanner would be to place, for example, an LCD or any other so-called flat panel display device, on the scanner plate or bed and "scan" the image on the calibrated display. The captured digital image data from each of the color areas of the test pattern can be stored in a device, for example, such as a computer for later use.

Referring now to step 18, compare the captured images to each of the calibrated reference images. Data from the captured images are compared to data from the calibrated reference images for colors that the user desires.

As noted in step 20, a relationship is computed between the colorimetry of the captured images and the colorimetry of the calibrated reference images to generate a data file that describes the colorimetry of said image capture device. In other words, a relationship is made between the captured images red, green and blue digital values with the known colors displayed on the calibrated reference images and a correction profile for the image capture device is generated. This relationship is not limited to the red, green and blue channel or digital values. It can be more than three colors or "channels," including a full description of the spectral properties such as radiance, reflectance, or irradiance.

Referring to step 22, a profile describing the colorimetric characteristics of the device is written such that the profile (a data file or other form of description describing the relationship) can calibrate the image capture device via a feedback mechanism. Preferably, the profile is written describing differences in images captured attributable to the characteristics of the image capture device.

Typically, this means that the final step is to take from the correction image, the stored digital data for each color area and use it to create a characterization or calibration profile for later use. For example, a user may use any type of conventional or newly developed characterization or calibration profile method including, for example, the characterization or calibration profile disclosed in U.S. Pat. No.

5,561,459. In the most preferred embodiment according to the present invention, the profile of the image capture device from step 22, is stored in the International Color Consortium (ICC) specification, although any format that meets the conditions according to the present invention, may be used. ICC profiles are device profiles that can be used to translate color data created on one device into a native color space of another device. These ICC profiles for the device characteristics may be embedded in an image file or stored in a memory in a connected personal computer. For example, the ICC profiles could be stored in a memory accessible by a CPU . In an attempt to identify color corrected images, conventional images are color tagged with information, often in an International Color Consortium ("ICC") color profile format, before posting on a compact disc, web site, or other repository for later viewing, as is well known in the industry and defined by the ICC Profile Format Specification, ICC 1:1998-09 and addenda, the contents of which are hereby incorporated by reference (latest version available at http://www.color.org). Further, the calibration or characterization profile can be in the form of a multidimensional look-up table (LUT) or perhaps a more simplified data that assumes some imaging model for the image capture device.

Once the initial calibration has occurred, a user can recalibrate the image capture device which can be easily implemented by regenerating the profile and comparing it to the calibrated reference images which were originally calculated and stored in the calibration memory.

Figure 2:
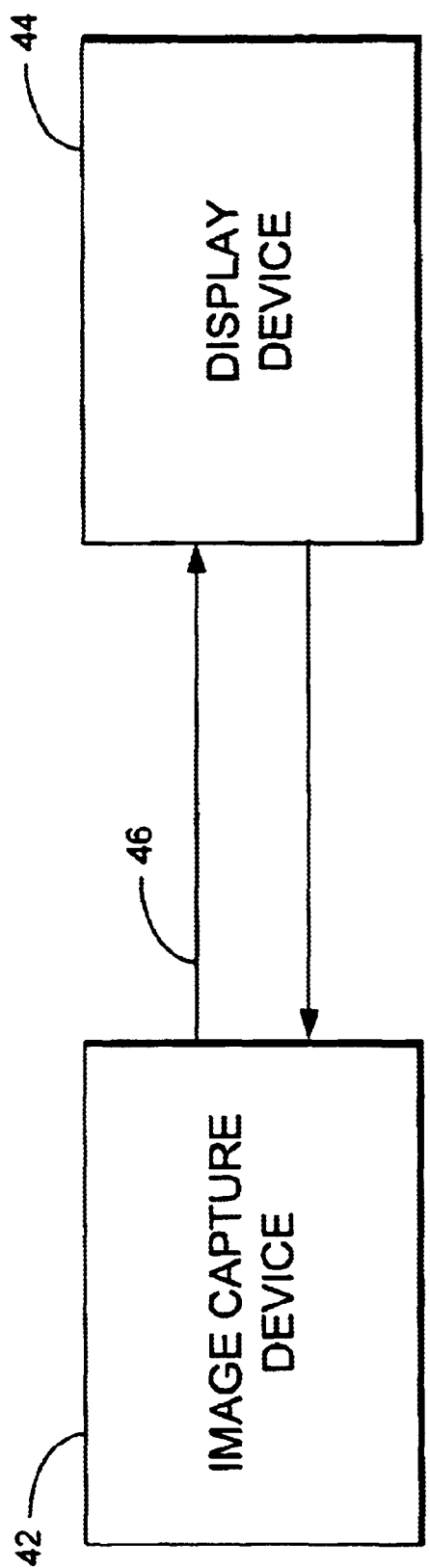
FIG. 2 is a functional block diagram of a calibration system for image capturing devices.

Referring now to FIG. 2, a functional block diagram of a calibration system 40 for image capturing devices is illustrated. Calibration system 40 is shown with image capture device 42, display device 44 and a transmit path 46.

In operation, an end user uses the display device 44 to calibrate an image capture device 42 The display device 44 is typically a variable display device that can display an image. In a preferred embodiment, the display device can be calibrated/characterized to display colors with known calorimetric properties (CIE tristimulus values). This calibration/characterization is preferably in the form of a profile. The standard format for the profile is the ICC. The profile preferably is colorimetric.

The display device 44 can be coupled to a Central Processing Unit (CPU), and can contain a memory. Peripheral devices of display device 44 includes terminals, data storage devices, printers. The display device 44 can be coupled to a conventional computer system which includes hardware and/or software components. According to the present invention, the computer can control the display device to generate a colorimetrically calibrated/ characterized display, by using various software application programs which can operate to calibrate the display device. These software application programs are well known in the art and are described above. At least one reference image can be displayed on the calibrated display generating a calibrated reference image with known colorimetric properties.

According to the present invention, the system includes a transmit path 46 between image capture device 42 and display device 44. The transmit path 46 can also function as a feedback loop which, according to the present invention, can be used as a link to transfer images between the display device 44 and image capture device 42 resulting in a calibrated image capture device 42.

The image capture device 42 can be any image capture device that can be calibrated and known to those skilled in the art including scanners, monitors, printers, televisions or digital cameras. The image capture device 42 typically captures images and via the transmit path 46, transfers the captured images to the displayed device 44. The captured images and the known colorimetric properties of the calibrated reference images are compared and a relationship between the captured images and the calibrated images is computed. Next a profile is written describing colorimetric characteristics of the image capture device according to the relationship, which can be transmitted via the transmit path 46, from the now calibrated display device 44 to calibrate the image capture device 42.

The present invention includes a number of features and advantages. First, the present invention provides a simple method and system for calibrating and characterizing an image capture device using a calibrated display of known calorimetric properties. The calibration features of the present invention require little user intervention. Further, distortions introduced by elements typically seen in calibration methods are reduced. For example, distortions introduced by having a fixed calibrated image that can fade or distort colors over time due to exposure to light or wear and tear, are eliminated by using the flexible calorimetric system according to the present invention. Further, many of the distortions that depend on fixed calibrations are often time-varying and are often unable to compensate for drift over time. The present invention permits the user to compensate for these time-varying problems. Still further, typically an application will print a saved image in one file format differently from the same image in a different file format. The present invention keeps track of the file format that was used for the calibration images by encoding them in a suitable profile format that are created from those calibration images.

Having now described the invention in accordance with the requirements of the patent statutes, those skilled in the art will understand how to make changes and modifications in the present invention to meet their specific requirements or conditions. Such changes and modifications may be made without departing from the scope and spirit of the invention as set forth in the following claims.

What is claimed is:

1. A method for calibrating and characterizing an image capture device, comprising the steps of:
   i) calibrating a display device to generate a calibrated display;
   ii) displaying at least one reference image on the calibrated display to generate a calibrated reference image with known calorimetric properties, said at least one reference image simulating the average correlated color temperature of a light source of images to be subsequently captured;
   iii) capturing at least one image from an image capture device to be calibrated, to generate a captured image;
   iv) comparing the captured image with the known calorimetric properties of the calibrated reference image;
   v) computing a relationship between the captured image and the known calorimetric properties of calibrated reference image; and
   vi) writing a profile describing colorimetric characteristics of the image capture device according to the relationship such that the profile can be used to calibrate the image capture device.

2. A method for enhancing captured images, comprising:
   operating an image capture device to form a captured image of a first image displayed on a calibrated display device having known display properties; and
   determining differences between the first image and the captured image for capturing subsequent images with the image capture device in accordance with the difference;

wherein operating an image capture device to form a captured image of a first image displayed on a calibrated display device comprises:
   operating an image capture device to form a captured image of a first image simulating the light source of the images subsequently captured with the image capture device; and
wherein capturing a first image simulating the light source of the images to be subsequently captured with the image capture device comprises:
   capturing at least one reference image simulating the average correlated color temperature of the light source of the images subsequently captured with the image capture device.

3. The method of claim 2, wherein determining differences between the first image and the captured image comprises:
   determining differences between the first image and the captured image for adjusting the image capture device to capture subsequent images in accordance with the differences.

4. The method of claim 2, wherein determining differences between the first image and the captured image comprises:
   determining differences between the first image and the captured images for adjusting images subsequently captured with the image capture device in accordance with the differences.

5. The method of claim 2, wherein operating an image capture device to form a captured image of a first image displayed on a calibrated display device comprises:
   operating an image capture device to form a captured image of a first image displayed on a display device calibrated to display accurate color, to display accurate spectral radiance, or to exhibit known colorimetric characteristics.

6. The method of claim 5, wherein operating an image capture device to form a captured image of a first image displayed on a calibrated display device comprises:
   operating an image capture device to form a captured image of a first image displayed on a calibrated display device displaying one or more primary colors.

7. The method of claim 2, wherein operating an image capture device to form a captured image of a first image displayed on a calibrated display device further comprises:
   generating the first image for display on the calibrated display device.

8. The method of claim 7, wherein generating the first image for display on the calibrated display device comprises:
   generating a series of first images for display on the calibrated display device.

9. The method of claim 8, wherein generating a series of images for display on the calibrated display device further comprises:
   writing a first image profile to be stored in memory for subsequent display of the first images.

10. The method of claim 2, wherein operating an image capture device to form a captured image of a first image displayed on a calibrated display device further comprises:
   operating an image capture device to form a captured image of a first image comprising the primary colors of red, green, and blue.

11. The method of claims 2, wherein operating an image capture device to form a captured image of a first image displayed on a calibrated display device comprises:
   operating an image capture device to form a captured image of a first image comprising redundant colors, redundant colored areas, or comprising a color test pattern.

12. The method of claim 2, wherein operating an image capture device to form a captured image of a first image displayed on a calibrated display device comprises:
   operating an image capture device to form captured images of a series of first images displayed on a calibrated display device.

13. The method of claim 12, wherein operating an image capture device to form captured images of a series of first images displayed on a calibrated display device comprises:
   operating an image capture device to form captured images of a series of first images comprising the primary colors of red, green, and blue.

14. The method of claims 12, wherein capturing a series of reference images displayed on the calibrated display device comprises:
   capturing a series of reference images comprising redundant colors, redundant colored areas, or color test patterns.

15. The method of claim 2, wherein operating an image capture device to form a captured image of a first image displayed on a calibrated display device comprises:
   operating an image capture device to form a captured image of a first image simulating properties of the source of the images subsequently captured with the image capture device.

16. The method of claim 2, wherein operating an image capture device to form a captured image of a first image displayed on a calibrated display device comprises:
   operating an image capture device to form a captured image of a first image comprising regions of the image capture device color space selected in accordance with the nonlinearity of the image capture device.

17. The method of claim 12, wherein operating an image capture device to form captured images of a series of first images displayed on a calibrated display device comprises:
   operating an image capture device to form captured images of a series of first images comprising test patterns having varied spatial locations.

18. The method of claim 17, wherein determining differences comprises:
   determining differences between each first image and the captured image associated with each such first image.

19. The method of claim 17, wherein determining differences further comprises:
   averaging the captured images.

20. The method of claim 12, wherein operating an image capture device to form captured images of a series of first images displayed on a calibrated display device comprises:
   operating an image capture device to form captured images of a series of first images displayed on a calibrated display device, each such first image consisting of one color.

21. The method of claim 2, wherein determining differences between the first image and the captured image further comprises:
   creating a profile for the image capture device in accordance with the differences.

22. The method of claim 21, wherein creating a profile for the image capture device in accordance with the differences comprises:
   creating an ICC profile for the image capture device.

23. The method of claim 21, wherein creating a profile for the image capture device in accordance with the differences comprises:
   creating a profile for the image capture device to capture subsequent images in accordance with the profile.

24. The method of claim 23, wherein creating a profile for the image capture device to capture subsequent images in accordance with the profile comprises:

creating a profile for the image capture device to adjust the image capture device to capture subsequent images in accordance with the profile.

25. The method of claim 23, creating a profile for the image capture device to capture subsequent images in accordance with the profile comprises:

creating a profile for the image capture device to adjust images subsequently captured with the image capture device in accordance with the profile.

26. The method of claim 2, wherein determining differences between the first image and the captured image comprises:

determining differences between any of the radiance, reflectance, irradiance, or colors of the first image and the captured image.

27. A method for operating a digital image capture device, comprising:

operating a digital image capture device to form a captured image of a first image displayed on a display monitor calibrated to display the first image with known color characteristics, including providing a Central Processing Unit connected to the display monitor to display a first image on the display monitor calibrated to display the first image with known color characteristics; and determining differences between the first image and the captured image for capturing subsequent images with the digital image capture device in accordance with the differences;

wherein operating a digital image capture device to form a captured image of a first image on a display monitor calibrated to display the first image with known color characteristics comprises:

operating a digital image capture device to form a captured image of a first image simulating the average correlated color temperature of the light source of the images subsequently captured with the image capture device.

28. The method of claim 27, wherein providing a Central Processing Unit connected to the display monitor display a first image on the display monitor with known color characteristics further comprises:

providing a Central Processing Unit connected to the display monitor to generate a first image for display on the display monitor calibrated with known color characteristics.

29. The method of claim 28, wherein providing a Central Processing Unit connected to the display monitor to generate a first image for display on the display monitor with known color characteristics comprises:

providing a Central Processing Unit connected to a display monitor to generate a first image comprising the primary colors of red, green, and blue for display on the display monitor with known color characteristics.

30. The method of claim 28, wherein providing a Central Processing Unit connected to the display monitor to generate a first image for display on the display monitor with known color characteristics comprises:

providing a Central Processing Unit connected to a display monitor to generate a first image comprising redundant colors, redundant color areas, or a color test pattern.

31. The method of claim 27, wherein operating a digital image capture device to form a captured image of a first image displayed on a display monitor comprises:

operating a digital image capture device to form captured images of a series of first images displayed on a display monitor.

32. The method of claim 31, wherein operating a digital image capture device to form captured images of a series of first images displayed on a display monitor further comprises:

providing a Central Processing Unit connected to the display monitor to generate a series of first images for display on the display monitor.

33. The method of claim 32, wherein providing a Central Processing Unit connected to the display monitor to generate a series of first images comprises:

providing a Central Processing Unit connected to the display monitor to generate a series of first images comprising the primary colors of red, green, and blue.

34. The method of claim 32, wherein providing a Central Processing Unit connected to the display monitor to generate a series of reference images comprises:

providing a Central Processing Unit connected to the display monitor to generate a series of reference images comprising redundant colors, redundant colored areas, or color test patterns.

35. The method of claim 27, wherein operating a digital image capture device to form a captured image of a first image displayed on a calibrated display monitor comprises:

operating a digital camera to form a captured image of a first image displayed on a calibrated display monitor.

36. The method of claim 35, wherein operating a digital camera to form a captured image of a first image displayed on a calibrated display monitor further comprises:

disabling any image compensation features of the digital camera prior to operating the digital camera to form a captured image of a first image displayed on a calibrated display monitor.

37. The method of claim 27, wherein operating a digital image capture device to form a captured image of a first image on a display monitor calibrated to display the first image with known color characteristics comprises:

operating a scanner to form a captured image of a first image displayed on a display monitor calibrated to display the first image with known color characteristics.

38. The method of claim 27, wherein operating a digital image capture device to form a captured image of a first image on a display monitor calibrated to display the first image with known color characteristics comprises:

operating a digital image capture device to form a captured image of a first comprising regions of the image capture device color space selected in accordance with the nonlinearity of the digital image capture device.

39. The method of claim 32, wherein operating a digital image capture device to form captured images of a series of first images displayed on a display monitor comprises:

operating a digital image capture device to form captured images of a series of first images comprising test patterns having varied spatial locations.

40. The method of claim 39, wherein determining differences comprises:

determining differences between each first image and the captured image associated with each such first image.

41. The method of claim 40, wherein determining differences further comprises:

averaging the captured images.

42. The method of claim 32, wherein operating a digital image capture device to form captured images of a series of first images displayed on a display monitor comprises:

operating a digital image capture device to form captured images of a series of first images displayed on a display monitor, each such first image consisting of one color.

* * * * *